United States Patent [19]
Shimura

[11] Patent Number: 5,748,799
[45] Date of Patent: May 5, 1998

[54] IMAGE PROCESSING METHOD AND APPARATUS

[75] Inventor: Kazuo Shimura, Kanagawa-ken, Japan

[73] Assignee: Fuji Photo Film Co., Ltd., Kanagawa, Japan

[21] Appl. No.: 719,704

[22] Filed: Sep. 27, 1996

[30] Foreign Application Priority Data

Sep. 29, 1995 [JP] Japan .................. 7-252092

[51] Int. Cl.$^6$ .............. G06T 5/00; G06K 9/40; G06K 9/44
[52] U.S. Cl. .............. 382/260; 382/264; 382/266; 382/275
[58] Field of Search .............. 382/260, 264, 382/266, 275, 263, 261, 274, 254, 128, 130; 250/587; 358/447, 463

[56] References Cited

U.S. PATENT DOCUMENTS

| | | | |
|---|---|---|---|
| 4,315,318 | 2/1982 | Kato et al. | 382/264 |
| 4,317,179 | 2/1982 | Kato et al. | 382/264 |
| 4,387,428 | 6/1983 | Ishida et al. | 250/587 |
| 4,747,052 | 5/1988 | Hishinuma et al. | 250/587 |
| 4,903,205 | 2/1990 | Hishinuma | 382/130 |
| 5,291,403 | 3/1994 | Ito | 250/587 |

*Primary Examiner*—Scott Rogers
*Attorney, Agent, or Firm*—Sughrue, Mion, Zinn, Macpeak & Seas, PLLC

[57] ABSTRACT

A filtering process is carried out on an original image, which is constituted of a lattice-like array of picture elements, that are located at predetermined intervals along the rows and columns of the lattice-like array, by using a mask having a predetermined size and with respect to each of the picture elements of the original image. The mean value of the values of picture elements falling within the mask is calculated with the filtering process, and a smoothed image represented by the thus calculated mean values is thereby obtained. The filtering process is carried out repeatedly on the smoothed image. Processing for emphasizing high frequency components of the original image is then carried out in accordance with the smoothed image, which has thereby been obtained. A processed image, in which an artifact is not perceptible, is thereby obtained.

14 Claims, 4 Drawing Sheets

F I G. 5
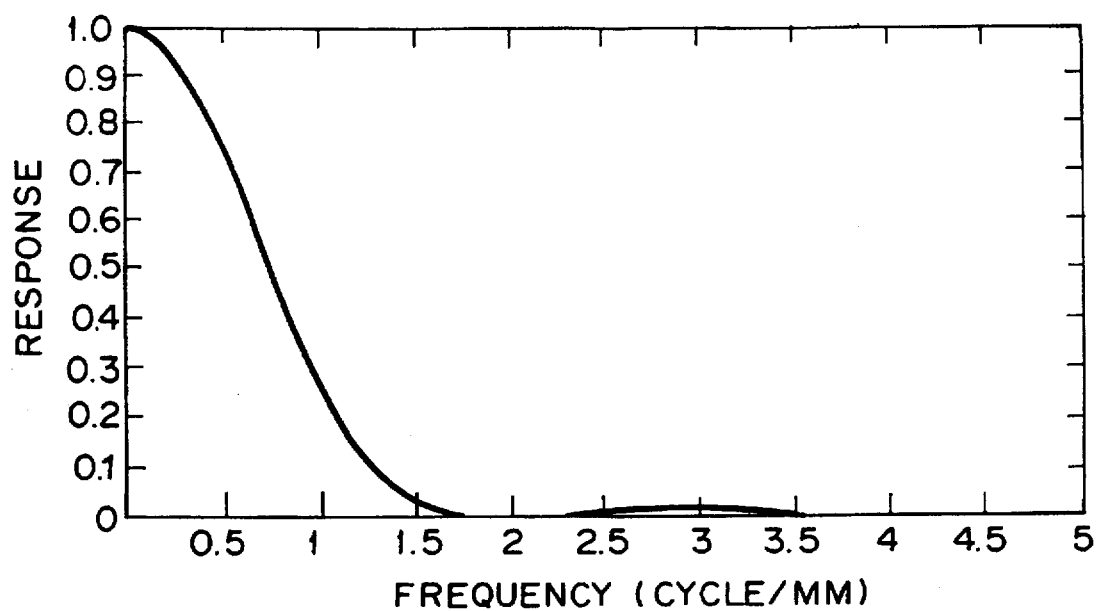
F I G. 6
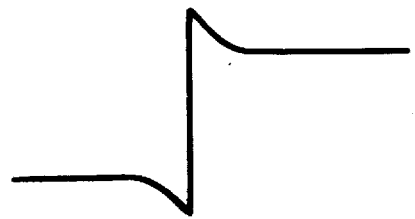
F I G. 7
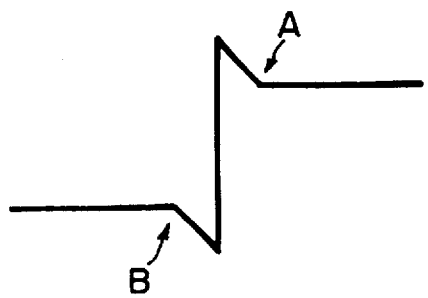

IMAGE PROCESSING METHOD AND APPARATUS

BACKGROUND OF THE INVENTION

1. Field of the Invention

This invention relates to an image processing method and apparatus, wherein a filtering process is carried out on an original image by using a mask having a predetermined size, a smoothed image being thereby obtained from the original image, and an unsharp mask processing for emphasizing the high frequency components of the original image is then carried out in accordance with the smoothed image.

2. Description of the Prior Art

Techniques for obtaining an image signal, which represents an image, carrying out appropriate image processing on the image signal, and thereafter reproducing a visible image from the processed image signal have heretofore been carried out in various fields. For example, the applicant proposed methods for carrying out frequency emphasis processing, such as unsharp mask processing, on an image signal in order that a visible radiation image having good image quality can be reproduced and used as an effective tool in, particularly, the accurate and efficient diagnosis of an illness. The methods for carrying out the frequency emphasis processing are disclosed in, for example, U.S. Pat. Nos. 4,315,318 and 4,317,179. With the frequency emphasis processing, an unsharp mask image signal (hereinbelow often referred to as the unsharp image signal) Sus is subtracted from an original image signal Sorg, which has been detected from a radiation image. The obtained difference value is multiplied by an emphasis coefficient $\beta$. The resulting product is then added to the original image signal Sorg. In this manner, predetermined frequency components in the image can be emphasized. The frequency emphasis processing is represented by Formula (1) shown below.

$$Sproc = Sorg + \beta(Sorg - Sus) \quad (1)$$

wherein Sproc represents the signal obtained from the frequency emphasis processing, Sorg represents the original image signal, Sus represents the unsharp image signal, and $\beta$ represents the emphasis coefficient.

The unsharp image signal Sus can be obtained by carrying out an operation with Formula (2)

$$Sus = \Sigma Sorg/(M \times N) \quad (2)$$

on the image signal components of the original image signal Sorg, which represent M×N picture elements surrounding a middle picture element. By way of example, each of picture elements constituting the image is taken as the middle picture element. From the operation, the mean value of the values of the image signal components of the original image signal Sorg, which represent M×N picture elements surrounding the middle picture element, is calculated. From the thus obtained unsharp image signal Sus, a smoothed image is obtained which results from the smoothing of the original image.

As described above, with the processing carried out with Formula (2), the mean value of the values of the image signal components of the original image signal Sorg, which represent M×N picture elements surrounding the middle picture element is calculated. The position of the mask constituted of the M×N picture elements is shifted successively by a distance corresponding to the length of a single picture element. The unsharp image signal Sus with respect to the entire area of the image is thus obtained, and the smoothed image is thereby obtained. In such cases, when the position of the mask is shifted after the operation has been carried out on the previous picture elements falling within the mask, several picture elements, which are among the previous picture elements, are again contained in the mask located at the new position, and several picture elements newly come into the mask. Therefore, after the position of the mask is shifted, the operation may be carried out only on the values of the picture elements newly coming into the mask. In this manner, the mean value can be calculated. Accordingly, the amount of operations does not become very large. As a result, even if a mask having a comparatively large size is set, the operations can be carried out quickly.

As described above, the smoothed image can be obtained quickly from the processing carried out with Formula (2) shown above, and the processed image can be obtained by carrying out the unsharp mask processing with Formula (1) shown above. However, as illustrated in, for example, FIG. 7, the processed image, which is obtained from the unsharp mask processing carried out with the smoothed image having been obtained with Formula (2), has the characteristics such that, at an edge in the image at which the signal value changes sharply, the change in the signal value may not become smooth in the processed image, and sharp boundaries occur at the portions indicated by A and B. Due to the sharp boundaries, an artifact becomes perceptible at the edge, at which the image density changes sharply, in the reproduced image. Therefore, a reproduced image having good image quality cannot be obtained.

SUMMARY OF THE INVENTION

The primary object of the present invention is to provide an image processing method, with which a processed image is obtained such that an artifact may not become perceptible.

Another object of the present invention is to provide an apparatus for carrying out the image processing method.

The present invention provides an image processing method comprising the steps of:

i) carrying out a filtering process on an original image, which is constituted of a lattice-like array of picture elements, that are located at predetermined intervals along the rows and columns of the lattice-like array, by using a mask having a predetermined size and with respect to each of the picture elements of the original image, the mean value of the values of picture elements falling within the mask being calculated with the filtering process, a smoothed image represented by the thus calculated mean values being thereby obtained, and ii) carrying out processing for emphasizing high frequency components of the original image in accordance with the smoothed image, wherein the filtering process is carried out repeatedly on the smoothed image.

The present invention also provides an image processing apparatus comprising:

i) a filtering process means for carrying out a filtering process on an original image, which is constituted of a lattice-like array of picture elements, that are located at predetermined intervals along the rows and columns of the lattice-like array, by using a mask having a predetermined size and with respect to each of the picture elements of the original image, the mean value of the values of picture elements falling within the mask being calculated with the filtering process, a smoothed image represented by the thus calculated mean values being thereby obtained, and ii) an unsharp mask processing means for carrying out processing for emphasizing high frequency components of the original image in accordance with the smoothed image, wherein the filtering process means repeatedly carries out the filtering process on the smoothed image.

With the image processing method and apparatus in accordance with the present invention, the filtering process for obtaining the smoothed image is carried out repeatedly on the smoothed image. Therefore, in a smoothed image which is obtained ultimately, the change in the signal value becomes smoother and the high frequency components of the original image have been eliminated even further than in a smoothed image, which is obtained with the conventional technique for carrying out only a single time of filtering process. Accordingly, a processed image can be obtained from the unsharp mask processing, which is carried out in accordance with the ultimately obtained smoothed image, such that the change in the signal value may be smooth in the region corresponding to the portion of the original image, at which the image density changes sharply, and such that the high frequency components may have been restricted sufficiently. As a result, a processed image can be obtained, in which the change in the image density is smooth, and in which an artifact is not perceptible.

BRIEF DESCRIPTION OF THE DRAWINGS

FIG. 5 is a graph showing frequency characteristics of a smoothed image, which is obtained by carrying out a filtering process three times, FIG. 6 is an explanatory view showing characteristics of a processed image, which is obtained with the image processing method and apparatus in accordance with the present invention, FIG. 7 is an explanatory view showing characteristics of a processed image, which is obtained with conventional unsharp mask processing.

DESCRIPTION OF THE PREFERRED EMBODIMENTS

The present invention will hereinbelow be described in further detail with reference to the accompanying drawings.

Figure 1:
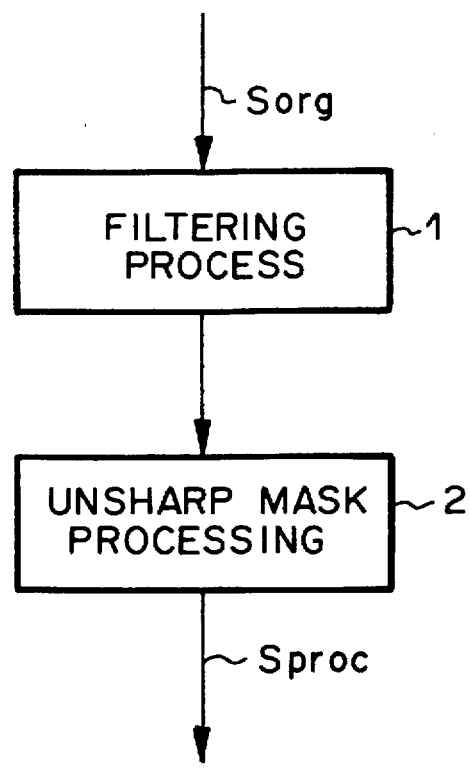
FIG. 1 is a block diagram showing the concept behind the image processing apparatus in accordance with the present invention.

FIG. 1 is a block diagram showing the concept behind the image processing apparatus in accordance with the present invention. As illustrated in FIG. 1, the image processing apparatus in accordance with the present invention comprises a filtering process means 1 and an unsharp mask processing means 2. The filtering process means 1 carries out a filtering process on a received original image signal Sorg by using a mask having a predetermined size and thereby obtains an unsharp image signal Sus. The filtering process is carried out repeatedly. The unsharp mask processing means 2 carries out unsharp mask processing in accordance with the unsharp image signal Sus, which has been obtained from the filtering process means 1. With the unsharp mask processing, the high frequency components of the original image signal Sorg are emphasized. A processed image signal Sproc is obtained from the unsharp mask processing.

How the processing is carried out in the filtering process means 1 will be described hereinbelow. Firstly, the filtering process is carried out by using a mask having a size of N×N picture elements and with respect to each of the picture elements constituting the original image, which is represented by the original image signal Sorg. The filtering process is carried out with Formula (3) shown below.

$$Sus(i,j) = \frac{\sum_{k=i-N/2,i+N/2} \sum_{l=j-N/2,j+N/2}}{N \times N} Sorg(k,l) \quad (3)$$

Figure 2:
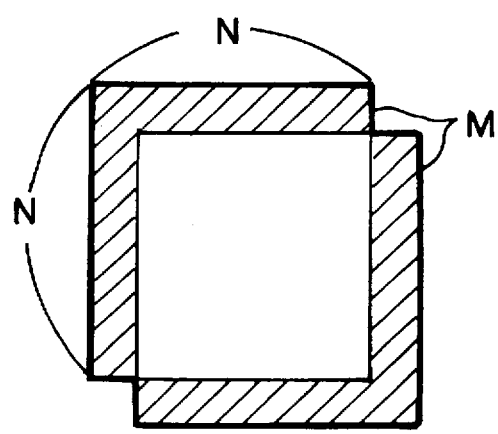
FIG. 2 is an explanatory view showing how a filtering process is carried out with a mask constituted of N×N picture elements.

With the filtering process carried out with Formula (3), the mean value of the values of the picture elements falling within the mask having the size of N×N picture elements is calculated. The position of the mask constituted of the N×N picture elements is shifted successively by a distance corresponding to the length of a single picture element. The unsharp image signal Sus with respect to the entire area of the image is thus obtained. In such cases, as illustrated in FIG. 2, when the position of the mask M is shifted after the operation has been carried out on the previous picture elements falling within the mask M, several picture elements, which are among the previous picture elements, are again contained in the mask M located at the new position, and several picture elements (indicated by the hatching on the right side in FIG. 2) newly come into the mask M. Therefore, after the position of the mask M is shifted, the operation may be carried out only on the values of the picture elements newly coming into the mask M. In this manner, the mean value can be calculated. Accordingly, even if the filtering process is carried out over the entire area of the image by using a mask having a comparatively large size, the amount of operations will not become very large, and the operations can be carried out quickly.

Thereafter, the filtering process is carried out on the smoothed image, which is represented by the thus obtained unsharp image signal Sus, by using the mask having the size of N×N picture elements. The filtering process is carried out with Formula (4) shown below, and an unsharp image signal Sus' is thereby obtained.

$$Sus'(i,j) = \frac{\sum_{k=i-N/2,i+N/2} \sum_{l=j-N/2,j+N/2}}{N \times N} Sorg(k,l) \quad (4)$$

Figure 3:
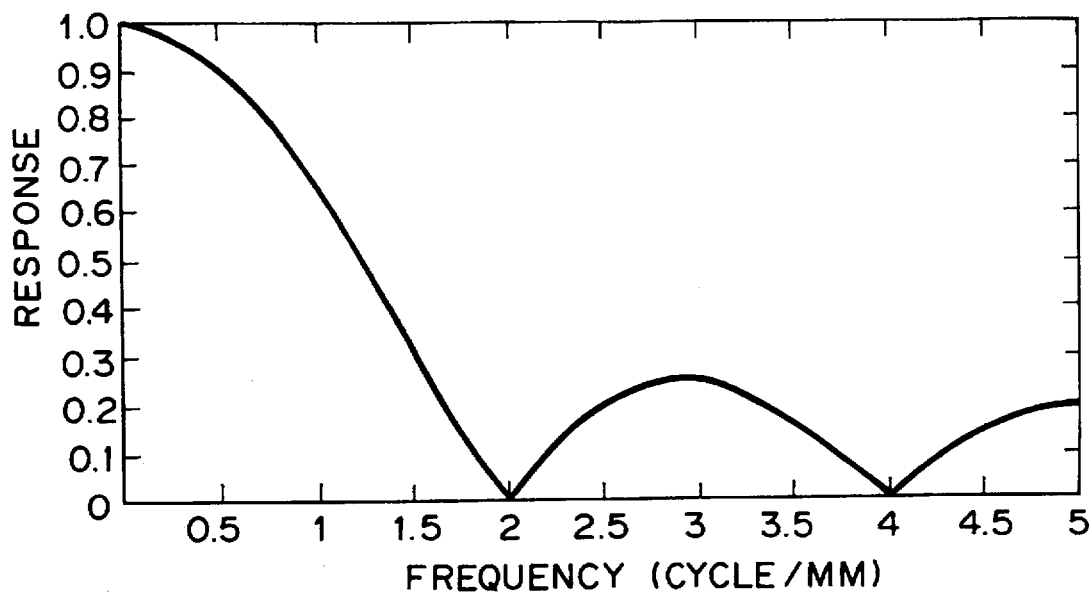
FIG. 3 is a graph showing frequency characteristics of a smoothed image, which is obtained by carrying out a filtering process one time.
Figure 4:
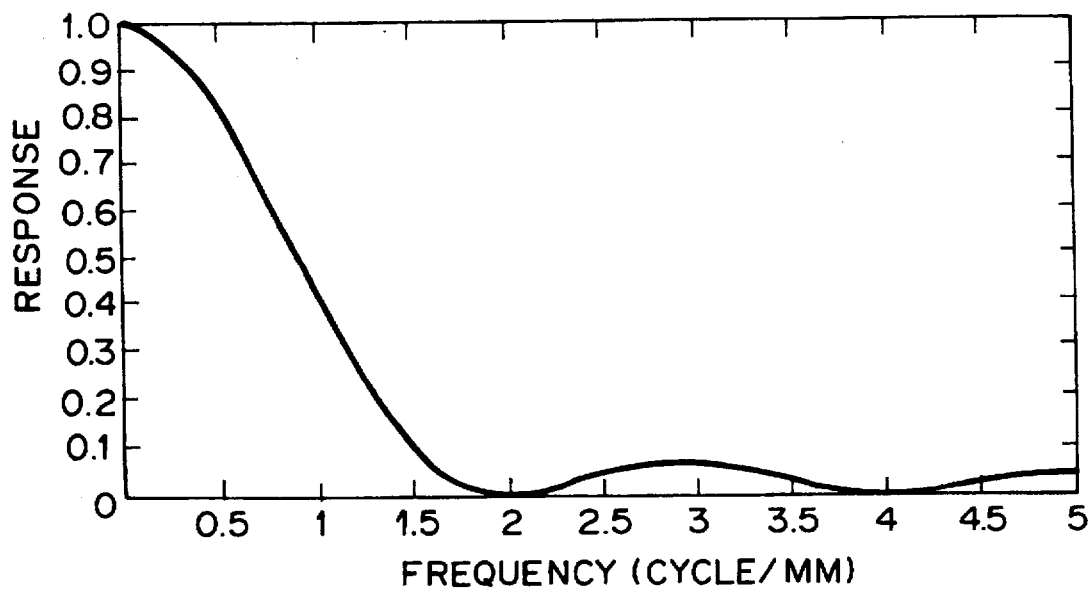
FIG. 4 is a graph showing frequency characteristics of a smoothed image, which is obtained by carrying out a filtering process two times.

The smoothed images, which are obtained by repeatedly carrying out the filtering process with the mask having the size of N×N picture elements, have the frequency characteristics shown in FIGS. 3, 4, and 5. FIG. 3 shows the frequency characteristics of the smoothed image, which is obtained by carrying out the filtering process one time with a mask having a size of 5×5 picture elements. FIG. 4 shows the frequency characteristics of the smoothed image, which is obtained by carrying out the filtering process two times with the mask having a size of 5×5 picture elements. FIG. 5 shows the frequency characteristics of the smoothed image, which is obtained by carrying out the filtering process three times with the mask having a size of 5×5 picture elements. As illustrated in FIG. 3, in cases where the filtering process is carried out one time, the high frequency components of 2 cycles/mm or higher remain in the smoothed image. As illustrated in FIGS. 4 and 5, as the filtering process is repeated, the high frequency components are eliminated even further, and the change in the signal value becomes smoother.

Thereafter, in the unsharp mask processing means 2, the unsharp mask processing is carried out in accordance with the unsharp image signal Sus', which has been obtained by carrying out the filtering process a plurality of times. The unsharp mask processing is carried out with Formula (5) shown below.

$$Sproc = Sorg + \beta(Sorg - Sus') \quad (5)$$

wherein Sproc represents the processed image signal, Sorg represents the original image signal, Sus' represents the unsharp image signal, and β represents the emphasis coefficient, which may be a fixed number or a function of the original image signal Sorg.

The processed image signal Sproc is then fed into an image reproducing means, such as a CRT display device, and is used for reproducing a visible image.

The processed image, which is represented by the processed image signal Sproc having been obtained with Formula (5), has the characteristics such that, as illustrated in FIG. 6, the change in the signal value may be smooth at the portions corresponding to the portions of the processed image obtained with the conventional unsharp mask processing, at which the signal value changes sharply as shown in FIG. 7. Thus in the processed image, which is represented by the processed image signal Sproc having been obtained with Formula (5), the boundaries, at which the image density changes sharply, do not occur at the portions corresponding to the portions A and B which are shown in FIG. 7. Therefore, in the processed image, which is represented by the processed image signal Sproc having been obtained with Formula (5), the artifact at the edge, or the like, in the image at which the image density changes sharply, becomes less perceptible than in the image, which is obtained by carrying out the processing with the mask having the size of N×N picture elements. Accordingly, a processed image can be obtained, which has good image quality and can be used as an effective tool in, particularly, the accurate and efficient diagnosis of an illness.

In the embodiment described above, the processed image is obtained by carrying out the unsharp mask processing with Formula (5). However, the image processing method and apparatus in accordance with the present invention is not limited to the use of Formula (5). For example, the image processing method and apparatus in accordance with the present invention is also applicable when the unsharp mask processing is carried out with one of Formulas (6), (7), (8), (9), and (10) shown below.

$$Sproc = Sus' + \beta \cdot \alpha(Sorg - Sus') \quad (6)$$

$$Sproc = Sorg + \beta 1 \cdot \alpha 1(Sorg - Sus1') + \\ \beta 2 \cdot \alpha 2(Sorg - Sus2') + \\ \beta 3 \cdot \alpha 3(Sorg - Sus3') \quad (7)$$

$$Sproc = Sus3' + \beta 1 \cdot \alpha 1(Sorg - Sus1') + \\ \beta 2 \cdot \alpha 2(Sorg - Sus2') + \\ \beta 3 \cdot \alpha 3(Sorg - Sus3') \quad (8)$$

$$Sproc = Sorg + \beta 1 \cdot \alpha 1(Sorg - Sus1') + \\ \beta 2 \cdot \alpha 2(Sus1' - Sus2') + \\ \beta 3 \cdot \alpha 3(Sus2' - Sus3') \quad (9)$$

-continued
$$Sproc = Sus3' + \beta 1 \cdot \alpha 1(Sorg - Sus1') + \\ \beta 2 \cdot \alpha 2(Sus1' - Sus2') + \\ \beta 3 \cdot \alpha 3(Sus2' - Sus3') \quad (10)$$

Figure 8:
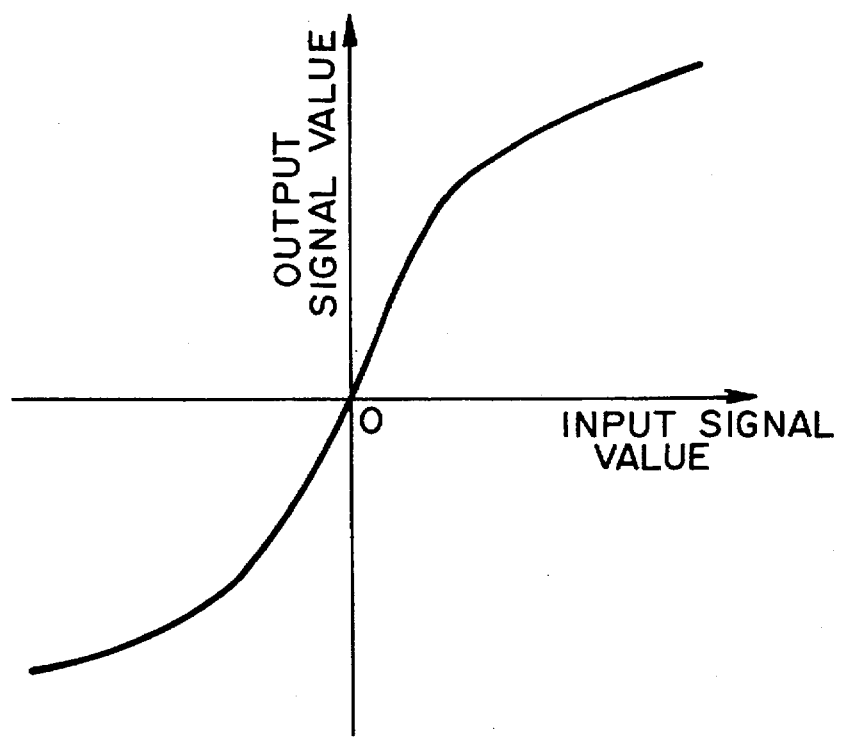
FIG. 8 is a graph showing a signal converting function.
Figure 9:
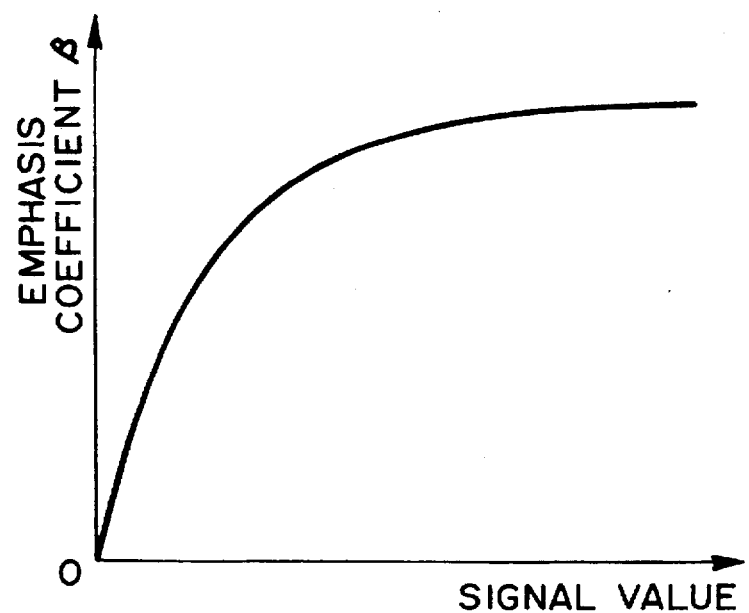
FIG. 9 is a graph showing an emphasis coefficient.

With Formula (6), the value of the difference (Sorg–Sus') between the original image signal Sorg and the unsharp image signal Sus' having been obtained from the smoothing process is calculated, and the difference value is converted with a signal converting function α. A converted signal is thereby obtained. The converted signal is then multiplied by the emphasis coefficient β, and an emphasized signal is thereby obtained. The emphasized signal is then added to the unsharp image signal Sus', and the processed image signal Sproc is thereby obtained. With Formula (7), the value of difference between the original image signal Sorg and each of unsharp image signals Sus1', Sus2', and Sus3', which have been obtained by carrying out the filtering process with masks having different sizes, is calculated. The difference values having thus been obtained are converted respectively with signal converting functions α1, α2, and α3 having the characteristics such that the absolute value of the difference value may be restricted in a region in which the absolute value of the difference value is large. In this manner, converted signals are obtained. The converted signals are then multiplied respectively by emphasis coefficients β1, β2, and β3, and emphasized signals are thereby obtained. The emphasized signals are then added to the original image signal Sorg, and the processed image signal Sproc is thereby obtained. In such cases, the sizes of the masks used for the filtering process are set such that (the mask size for the formation of Sus1')<(the mask size for the formation of Sus2')<(the mask size for the formation of Sus3'). As the signal converting functions a for converting the difference values, the function shown in FIG. 8 are employed. Also, as the emphasis coefficients β, by which the converted signals are multiplied, the emphasis coefficient shown in FIG. 9 is employed. Each signal converting function α is the function of the difference value. Each emphasis coefficient β is the function of the original image signal Sorg.

With Formula (8), the emphasized signals in Formula (7) are added to the unsharp image signal Sus3', and the processed image signal Sproc is thereby obtained. With Formula (9), as for the original image signal Sorg and the unsharp image signals Sus1', Sus2', and Sus3', which have been obtained by repeating the filtering process, the value of the difference between the signals of two adjacent frequency bands is calculated. The difference values having thus been obtained are converted respectively with the signal converting functions α1, α2, and α3 having the characteristics such that the absolute value of the difference value may be restricted in a region in which the absolute value of the difference value is large. In this manner, converted signals are obtained. The converted signals are then multiplied respectively by the emphasis coefficients β1, β2, and β3, and emphasized signals are thereby obtained. The emphasized signals are then added to the original image signal Sorg, and the processed image signal Sproc is thereby obtained. With Formula (10), the emphasized signals in Formula (9) are added to the unsharp image signal Sus3', and the processed image signal Sproc is thereby obtained.

In cases where one of Formulas (6), (7), (8), (9), and (10) shown above is employed, as in cases where the unsharp mask processing is carried out with Formula (5) shown above, a processed image can be obtained such that the artifact at the edge, or the like, in the image at which the image density changes sharply, may become less perceptible than in the image, which is obtained by carrying out the processing with the mask having the size of N×N picture elements. Accordingly, a processed image can be obtained, which has good image quality and can be used as an effective tool in, particularly, the accurate and efficient diagnosis of an illness. In cases where one of Formula (7), (8), (9), and (10) is employed, the three kinds of the masks are used. However, the number of the kinds of the masks is not limited to three. In cases where many masks are employed, the emphasis can be controlled more finely.

What is claimed is:

1. An image processing method comprising the steps of:
   i) carrying out a filtering process on an original image, which is constituted of a lattice-like array of picture elements, that are located at predetermined intervals along the rows and columns of the lattice-like array, by using a mask having a predetermined size and with respect to each of the picture elements of the original image, the mean value of the values of picture elements falling within the mask being calculated with the filtering process, a smoothed image represented by the thus calculated mean values being thereby obtained, and
   ii) carrying out processing for emphasizing high frequency components of the original image in accordance with the smoothed image,
   wherein the filtering process is carried out repeatedly on the smoothed image.

2. A method as defined in claim 1 wherein the processing for emphasizing the high frequency components of the original image is carried out with Formula $$Sproc = Sorg + \beta(Sorg - Sus')$$

wherein Sproc represents the processed image signal in which the high frequency components have been emphasized, Sorg represents the original image signal representing the original image, Sus' represents the unsharp image signal which represents the smoothed image having been obtained by repeating the filtering process, and $\beta$ represents the emphasis coefficient.

3. A method as defined in claim 1 wherein the processing for emphasizing the high frequency components of the original image is carried out with Formula $$Sproc = Sus + \beta \cdot \alpha(Sorg - Sus')$$

wherein Sproc represents the processed image signal in which the high frequency components have been emphasized, Sorg represents the original image signal representing the original image, Sus' represents the unsharp image signal which represents the smoothed image having been obtained by repeating the filtering process, $\alpha$ represents the signal converting function, and $\beta$ represents the emphasis coefficient.

4. A method as defined in claim 1 wherein the processing for emphasizing the high frequency components of the original image is carried out with Formula $$Sproc = Sorg + \beta 1 \cdot \alpha 1(Sorg - Sus1') + \\ \beta 2 \cdot \alpha 2(Sorg - Sus2') + \\ \beta 3 \cdot \alpha 3(Sorg - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by carrying out the filtering process with masks having different sizes, $\alpha 1$, $\alpha 2$, and $\alpha 3$ represent the signal converting functions, and $\beta 1$, $\beta 2$, and $\beta 3$ represent the emphasis coefficients.

5. A method as defined in claim 1 wherein the processing for emphasizing the high frequency components of the original image is carried out with Formula $$Sproc = Sus3' + \beta 1 \cdot \alpha 1(Sorg - Sus1') + \\ \beta 2 \cdot \alpha 2(Sorg - Sus2') + \\ \beta 3 \cdot \alpha 3(Sorg - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by carrying out the filtering process with masks having different sizes, $\alpha 1$, $\alpha 2$, and $\alpha 3$ represent the signal converting functions, and $\beta 1$, $\beta 2$, and $\beta 3$ represent the emphasis coefficients.

6. A method as defined in claim 1 wherein the processing for emphasizing the high frequency components of the original image is carried out with Formula $$Sproc = Sorg + \beta 1 \cdot \alpha 1(Sorg - Sus1') + \\ \beta 2 \cdot \alpha 2(Sus1' - Sus2') + \\ \beta 3 \cdot \alpha 3(Sus2' - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by repeating the filtering process, $\alpha 1$, $\alpha 2$, and $\alpha 3$ represent the signal converting functions, and $\beta 1$, $\beta 2$, and $\beta 3$ represent the emphasis coefficients.

7. A method as defined in claim 1 wherein the processing for emphasizing the high frequency components of the original image is carried out with Formula $$Sproc = Sus3' + \beta 1 \cdot \alpha 1(Sorg - Sus1') + \\ \beta 2 \cdot \alpha 2(Sus1' - Sus2') + \\ \beta 3 \cdot \alpha 3(Sus2' - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by repeating the filtering process, $\alpha 1$, $\alpha 2$, and $\alpha 3$ represent the signal converting functions, and $\beta 1$, $\beta 2$, and $\beta 3$ represent the emphasis coefficients.

8. An image processing apparatus comprising:
   i) a filtering process means for carrying out a filtering process on an original image, which is constituted of a lattice-like array of picture elements, that are located at predetermined intervals along the rows and columns of the lattice-like array, by using a mask having a predetermined size and with respect to each of the picture elements of the original image, the mean value of the values of picture elements falling within the mask being calculated with the filtering process, a smoothed image represented by the thus calculated mean values being thereby obtained, and ii) an unsharp mask processing means for carrying out processing for emphasizing high frequency components of the original image in accordance with the smoothed image, wherein the filtering process means repeatedly carries out the filtering process on the smoothed image.

9. An apparatus as defined in claim 8 wherein the processing for emphasizing the high frequency components of the original image is carried out with Formula $$Sproc = Sorg + \beta(Sorg - Sus')$$

wherein Sproc represents the processed image signal in which the high frequency components have been emphasized, Sorg represents the original image signal representing the original image, Sus' represents the unsharp image signal which represents the smoothed image having been obtained by repeating the filtering process, and $\beta$ represents the emphasis coefficient.

10. An apparatus as defined in claim 8 wherein the processing for emphasizing the high frequency components of the original image is carried out with Formula $$Sproc = Sus' + \beta \cdot \alpha(Sorg - Sus')$$

wherein Sproc represents the processed image signal in which the high frequency components have been emphasized, Sorg represents the original image signal representing the original image, Sus' represents the unsharp image signal which represents the smoothed image having been obtained by repeating the filtering process, a represents the signal converting function, and $\beta$ represents the emphasis coefficient.

11. An apparatus as defined in claim 8 wherein the processing for emphasizing the high frequency components of the original image is carried out with Formula $$Sproc = Sorg + \beta 1 \cdot \alpha 1(Sorg - Sus1') + \\ \beta 2 \cdot \alpha 2(Sorg - Sus2') + \\ \beta 3 \cdot \alpha 3(Sorg - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by carrying out the filtering process with masks having different sizes, $\alpha 1$, $\alpha 2$, and $\alpha 3$ represent the signal converting functions, and $\beta 1$, $\beta 2$, and $\beta 3$ represent the emphasis coefficients.

12. An apparatus as defined in claim 8 wherein the processing for emphasizing the high frequency components of the original image is carried out with Formula $$Sproc = Sus3' + \beta 1 \cdot \alpha 1(Sorg - Sus1') + \\ \beta 2 \cdot \alpha 2(Sorg - Sus2') + \\ \beta 3 \cdot \alpha 3(Sorg - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by carrying out the filtering process with masks having different sizes, $\alpha 1$, $\alpha 2$, and $\alpha 3$ represent the signal converting functions, and $\beta 1$, $\beta 2$, and $\beta 3$ represent the emphasis coefficients.

13. An apparatus as defined in claim 8 wherein the processing for emphasizing the high frequency components of the original image is carried out with Formula $$Sproc = Sorg + \beta 1 \cdot \alpha 1(Sorg - Sus1') + \\ \beta 2 \cdot \alpha 2(Sus1' - Sus2') + \\ \beta 3 \cdot \alpha 3(Sus2' - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by repeating the filtering process, $\alpha 1$, $\alpha 2$, and $\alpha 3$ represent the signal converting functions, and $\beta 1$, $\beta 2$, and $\beta 3$ represent the emphasis coefficients.

14. An apparatus as defined in claim 8 wherein the processing for emphasizing the high frequency components of the original image is carried out with Formula $$Sproc = Sus3' + \beta 1 \cdot \alpha 1(Sorg - Sus1') + \\ \beta 2 \cdot \alpha 2(Sus1' - Sus2') + \\ \beta 3 \cdot \alpha 3(Sus2' - Sus3')$$

wherein Sproc represents the processed image signal in which the high frequency components have been emphasized, Sorg represents the original image signal representing the original image, Sus1', Sus2', and Sus3' represent the unsharp image signals which represent the smoothed images having been obtained by repeating the filtering process, $\alpha 1$, $\alpha 2$, and $\alpha 3$ represent the signal converting functions, and $\beta 1$, $\beta 2$, and $\beta 3$ represent the emphasis coefficients.

* * * * *